US008101885B2

(12) United States Patent
Nakamae et al.

(10) Patent No.: US 8,101,885 B2
(45) Date of Patent: Jan. 24, 2012

(54) LASER PROCESSING METHOD AND LASER PROCESSING APPARATUS

(75) Inventors: Kazuo Nakamae, Yokohama (JP);
Motoki Kakui, Yokohama (JP); Shinobu Tamaoki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1215 days.

(21) Appl. No.: 11/878,693

(22) Filed: Jul. 26, 2007

(65) Prior Publication Data
US 2008/0029499 A1 Feb. 7, 2008

(30) Foreign Application Priority Data

Aug. 1, 2006 (JP) ................ P2006-209927

(51) Int. Cl.
*B23K 26/00* (2006.01)
(52) U.S. Cl. ......... 219/121.77; 219/121.67; 219/121.72; 219/121.76; 219/121.78
(58) Field of Classification Search ............ 219/121.77, 219/121.67, 121.72, 121.76, 121.78, 121.85
See application file for complete search history.

(56) References Cited

U.S. PATENT DOCUMENTS

| | | | | | |
|---|---|---|---|---|---|
| 3,953,706 | A | * | 4/1976 | Harris et al. | 219/121.68 |
| 4,625,093 | A | * | 11/1986 | Chryssolouris | 219/121.69 |
| 4,761,535 | A | * | 8/1988 | Lawson | 219/121.68 |
| 4,931,616 | A | * | 6/1990 | Usui et al. | 219/121.68 |
| 4,970,367 | A | * | 11/1990 | Miller | 219/121.68 |
| 5,620,754 | A | * | 4/1997 | Turchan et al. | 427/554 |
| 5,910,260 | A | * | 6/1999 | Gerber | 219/121.67 |
| 6,509,547 | B1 | * | 1/2003 | Bernstein et al. | 219/121.68 |
| 6,653,592 | B2 | * | 11/2003 | Andersen | 219/121.68 |
| 2004/0134965 | A1 | * | 7/2004 | Stepan | 228/1.1 |
| 2005/0150522 | A1 | * | 7/2005 | Okada | 134/22.11 |

FOREIGN PATENT DOCUMENTS

| | | |
|---|---|---|
| JP | 01-295609 | 11/1989 |
| JP | 04-275007 | 9/1992 |
| JP | 06-071467 | 3/1994 |
| JP | 06-262378 | 9/1994 |
| JP | 08-008028 | 1/1996 |
| JP | 08-019139 | 1/1996 |
| JP | 08-265931 | 10/1996 |
| JP | 2003-134628 | 5/2003 |

OTHER PUBLICATIONS

Catalog pf LP-V series products by SUNX limited. No. CJ-LPV10-I-10, p-8 Nov. 2005.

(Continued)

*Primary Examiner* — M. Alexandra Elve
(74) *Attorney, Agent, or Firm* — McDermott Will & Emery LLP

(57) ABSTRACT

The present invention relates to a method and apparatus having a structure that enables laser processing of an object even when the object has a surface formed with irregularities. The laser processing method irradiates objects, each having a cylindrical form extending in a first direction, with laser light. Here, the objects are arranged on a first plane along a second direction orthogonal to the first direction. The arranged objects are irradiated with first and second laser light beams in irradiation directions different from each other to the first plane. At least during when the first and second irradiation light beams are respectively emitted, irradiation positions of the first and second laser light beams to the first plane are relatively moved.

7 Claims, 3 Drawing Sheets

OTHER PUBLICATIONS

Japanese Notice of Reasons for Rejection, w/ English translation thereof, issued in Japanese Patent Application No. JP 2006-209927 dated May 24, 2011.

Japanese Notice of Allowance, w/ partial English translation thereof, issued in Japanese Patent Application No. 2006-209927, dated Dec. 20, 2011.

* cited by examiner

LASER PROCESSING METHOD AND LASER PROCESSING APPARATUS

BACKGROUND OF THE INVENTION

1. Field of the Invention

The present invention relates to a method and apparatus for processing an object to be processed by irradiating a surface thereof with laser light.

2. Related Background Art

Irradiating a surface of an object enables laser processing of the object surface corresponding to the part irradiated with the laser light. As such a laser processing apparatus, laser markers described in Nonpatent Document 1 have been known, for example.

[Nonpatent Document 1] Catalog of LP-V series products by SUNX Limited, No. CJ-LPV10-I-10, November, 2005.

SUMMARY OF THE INVENTION

The present inventors have studied the above conventional laser processing techniques, and as a result, have found the following problems. That is, the conventional laser processing techniques may fail to perform their aimed processing depending on the surface form of the object.

The present invention has been developed to eliminate the problems described above. It is an object of the present invention to provide a laser processing method and a laser processing apparatus comprising a structure for enabling laser processing of a surface of an object even when the object has a surface with irregularities, e.g., when a plurality of objects are regularly arranged.

A laser processing method and laser processing apparatus according to the present invention continuously processes respective surfaces of a plurality of objects each having a cylindrical form extending in a first direction is irradiated with laser light. The objects to be processed correspond to a multicore ribbon fiber in which a plurality of optical fibers arranged flatly and regularly are integrally coated with a resin, a plurality of resin-coated optical fibers each coated with a resin, a plurality of coaxial cables, and a plurality of metal tubes, for example. When the objects to be processed are a multicore fiber ribbon, a plurality of resin-coated optical fibers, or a plurality of coaxial cables, for example, the laser processing method and laser processing apparatus enable cutting and the like of resin layers coated on surfaces of the objects without damaging the inside.

In particular, the laser processing method according to the present invention comprises a first step of arranging a plurality of objects as an object to be processed having a surface formed with irregularities, a second step of emitting laser light in two directions, and a third step of changing a relative position of the laser light and objects.

In the first step, a plurality of objects, as the objects to be processed having a surface formed with irregularities, are arranged on a first plane along a second direction orthogonal to the first direction. In the second step, as viewing on a second plane which is orthogonal to the first plane and includes the second direction, first and second laser light beams are irradiated to the plurality of objects in first and second irradiation directions sandwiching the normal line to the first plane and forming an angle of 5° or more to the normal line. In other words, as viewing on the second plane, the plurality of objects are irradiated with the first laser light beam in the first irradiation direction which forms an angle of 85° or less with a first reference line on the first plane which extends along the second direction from an intersection point of the first plane and the first irradiation direction. Also, in the second step, a second laser light beam is emitted together with the first laser light beam. As viewing on the second plane, orthogonal to the first plane, including the second direction, the plurality of objects are irradiated with the second laser light beam in the second irradiation direction which differs from the first irradiation direction and forms an angle of 95° or more with a second reference line on the first plane which extends along the second direction from an intersection point of the first plane and the second irradiation direction. Further, in the third step, at least during when the first and second laser light beams are respectively emitted, respective irradiation positions of the first and second laser light beams are relatively moved with respect to the first plane.

When the structure mentioned above is expressed in an xyz-orthogonal coordinate system, the first and second directions orthogonal to each other correspond to x- and y-axes, the first plane corresponds to the xy-plane, and the second plane corresponds to the xz-plane. Here, the angle formed by the first plane and first irradiation direction corresponds to the angle formed between a line obtained when the optical axis of the first laser light beam is projected onto the second plane and a first reference line on the first plane corresponding to a part of a line of intersection between the first and second planes. The angle formed by the first plane and second irradiation direction corresponds to the angle formed between a line obtained when the optical axis of the second laser light beam is projected onto the second plane and the second reference line corresponding to a part of a line of intersection between the first and second planes.

Letting r be the radius of each of the plurality of objects, d be the minimum space between the plurality of objects, θ1 be the first irradiation angle, and θ2 be the second irradiation angle as parameters defined on the second plane, the angle θ1 falls within the range from $\sin^{-1}(r/(d+r))$ to 85°, and the angle θ2 falls within the range from 95° to $(180°-\sin^{-1}(r/(d+r)))$.

The laser processing apparatus according to the present invention comprises a light source system, a shifter, a first irradiation optical system, and a second irradiation optical system.

The light source system outputs first and second laser light beams as laser light irradiating a plurality of objects. The light source system may include either a single light source or at least two light sources. When the light source system includes a single light source, the laser light outputted from the single light source is once divided into two, and these two divided laser light components are outputted as first and second laser light beams, respectively. When the light source system includes at least two light sources, on the other hand, one light source (first light source) outputs the first laser light beam, while the other light source (second light source) outputs the second laser light beam. The first and second laser light beams may have the same wavelength.

In a state where the plurality of objects are arranged on a first plane along a second direction orthogonal to the first direction, the shifter relatively moves the position of the plurality of objects with respect to the emitted laser light. The first irradiation optical system functions to emit the first laser light beam, which is a part of the laser light outputted from the light source system, to the plurality of objects in a first irradiation direction which forms an angle of 85° or less with respect to a first reference line, as viewing on a second plane which is orthogonal to the first plane and includes the second direction. The first reference line is defined as a line extending along the second direction from an intersection point of the first plane and the first irradiation direction. The second irradiation optical system functions to emit the second laser light beam, which is a part of the laser light outputted from the light source system, to the plurality of objects in a second irradiation direction which differs from the first irradiation direction and forms an angle of 95° or more with respect to a second reference line, as viewing on the second plane, orthogonal to the first plane, including the second direction. The second reference line is defined as a line extending along the second direction from an intersection point of the first plane and the second irradiation direction.

Here, the angle formed by the first plane and first irradiation direction and the angle formed by the second plane and second irradiation direction are defined on the xz-plane in the xyz-orthogonal coordinate system as mentioned above.

In the laser processing apparatus according to the present invention, the shifter moves at least a part of the first and second irradiation optical systems along the second direction such that respective irradiation positions of the first and second laser light beams move along the second direction on the first plane.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1A is a view showing a structure for irradiating the upper face of an object with laser light as a first embodiment of the laser processing apparatus according to the present invention, whereas

DETAILED DESCRIPTION OF THE PREFERRED EMBODIMENTS

Figure 1A:
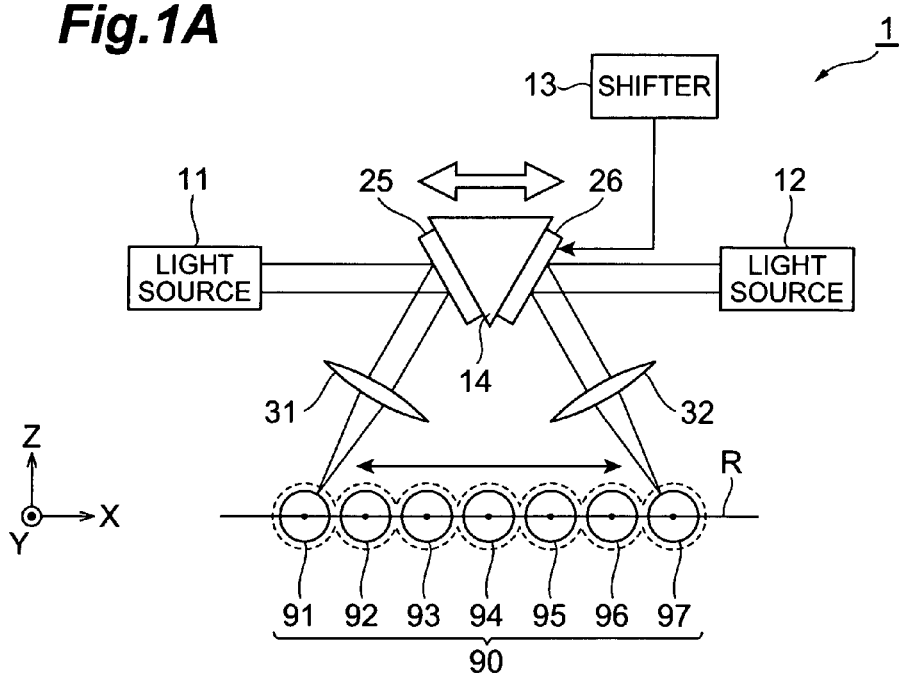

In the following, embodiments of a laser processing method and laser processing apparatus according to the present invention will be explained in detail with reference to FIGS. 1A, 1B, 2, 3A, and 3B. In the description of the drawings, identical or corresponding components are designated by the same reference numerals, and overlapping description is omitted.

Figure 1B:
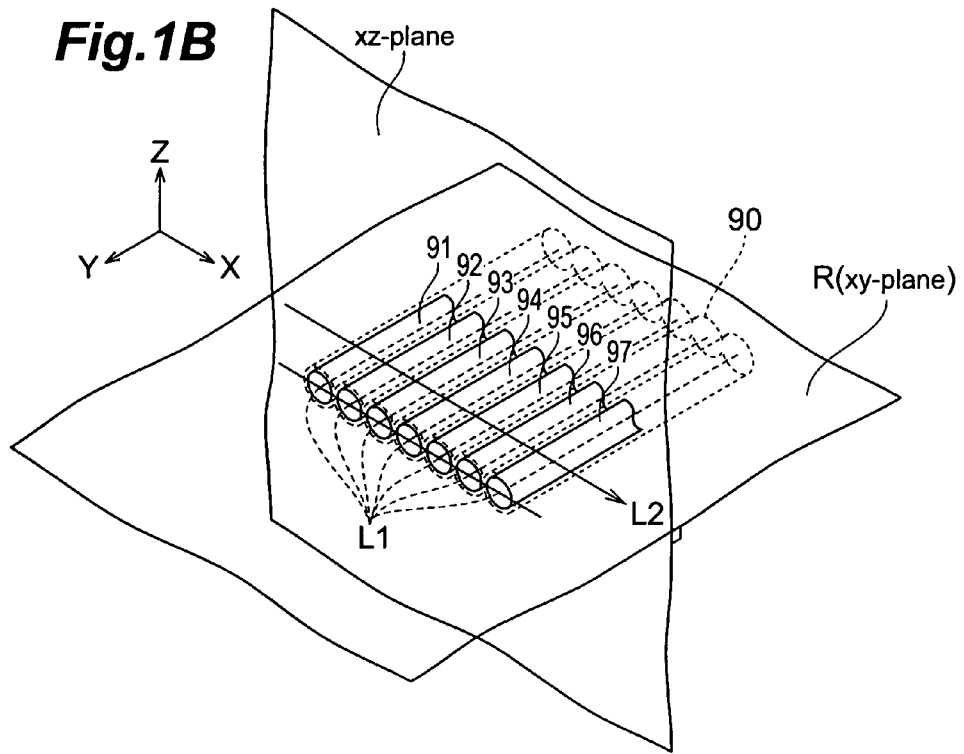
FIG. 1B is a perspective view for explaining the state of arrangement of the object to be processed.

FIG. 1A is a view showing a structure for irradiating the upper face of an object with laser light as a first embodiment of the laser processing apparatus according to the present invention, whereas FIG. 1B is a perspective view for explaining the state of arrangement of the object to be processed. FIG. 1A shows not only the laser processing apparatus 1 according to the first embodiment, but also an object to be processed 90. The object to be processed 90 is a concept having a structure with an uneven surface, which may also be constructed by regularly arranging a plurality of objects 91 to 97. When the arrangement of the plurality of objects 91 to 97 is explained in the xyz-orthogonal coordinate system, the objects 91 to 97 each extending along a first direction L1 (corresponding to the y-axis) are successively arranged on a first plane (corresponding to the xy-plane) along a second direction L2 (corresponding to the x-axis) orthogonal to the first direction L1. In this specification, FIGS. 1A, 1B, 2, 3A, and 3B show the whole and main parts of the laser processing apparatus as views projected on a second plane (xz-plane) which is a plane, orthogonal to the first plane, including the second direction L2. The explanation of this embodiment shows, as a typical example, a processing step of employing a multicore ribbon fiber in which a plurality of optical fibers corresponding to a plurality of objects 91 to 97, each being a cylindrical member, are integrally coated with a resin as an object to be processed 90 and cutting the resin layer on the surface of the object 90 without damaging the optical fibers 91 to 97.

The laser processing apparatus 1 comprises a light source system, mirrors 25, 26, lenses 31, 32, and a shifter 13. The light source system includes a light source 11 (first light source) for outputting a first laser light beam and a light source 12 (second light source) for outputting a second laser light beam. The mirror 25 and lens 31 constitute a first irradiation optical system for introducing the first laser light beam to the object to be processed 90, while the mirror 26 and lens 32 constitute a second irradiation optical system for introducing the second laser light beam to the object to be processed 90. As shown in FIG. 1B, the object to be processed 90 includes a multicore fiber ribbon in which seven cylindrical objects 91 to 97 arranged with equal intervals on a plane R (parallel arrangement surface) are integrally coated with a resin, for example.

The mirrors 25, 26 are attached to a head part 14 which is arranged on the upper face side of the object to be processed 90. As the shifter 13 moves the head part 14 along the second direction L2 on the plane R (see FIG. 1B), the position of the object 90 relatively changes with respect to the first and second laser light beams emitted in directions different from each other.

The light sources 11, 12 are optical devices for outputting the first and second laser light beams irradiating the object to be processed 90 in respective irradiation directions different from each other. For example, YAG laser light sources and optical fiber laser light sources including optical fibers whose optical waveguide regions are doped with elemental Yb are suitable for them.

In the laser processing apparatus 1 and laser processing method according to the first embodiment, the first laser light beam outputted from the light source 11 is converged by the lens 31 after being reflected by the mirror 25 as shown in FIG. 1A (in the case of the upper face irradiation). Namely, the first irradiation optical system constructed by the mirror 25 and lens 31 irradiates the upper face side of the object to be processed 90 with the converged first laser light beam. On the other hand, the second laser light beam outputted from the light source 12 is converged by the lens 32 after being reflected by the mirror 26. Namely, the second irradiation optical system constructed by the mirror 26 and lens 32 irradiates the upper face side of the object to be processed 90 with the converged second laser light beam in an irradiation direction different from that of the first laser light beam. During when such first and second laser light beams are emitted, the shifter 13 moves the head part 14 along the second direction L2 on the plane R, whereby each of the first and second laser light beams scans the surface (having irregularities) of the object to be processed 90 along the second direction L2. As a result, the resin layer positioned on the upper face side of the multicore fiber ribbon (including optical fibers as the plurality of objects 91 to 97) acting as the object to be processed 90 is cut by scanning with the first and second laser light beams along the second direction L2 as mentioned above without damaging the optical fibers 91 to 97.

Figure 2:
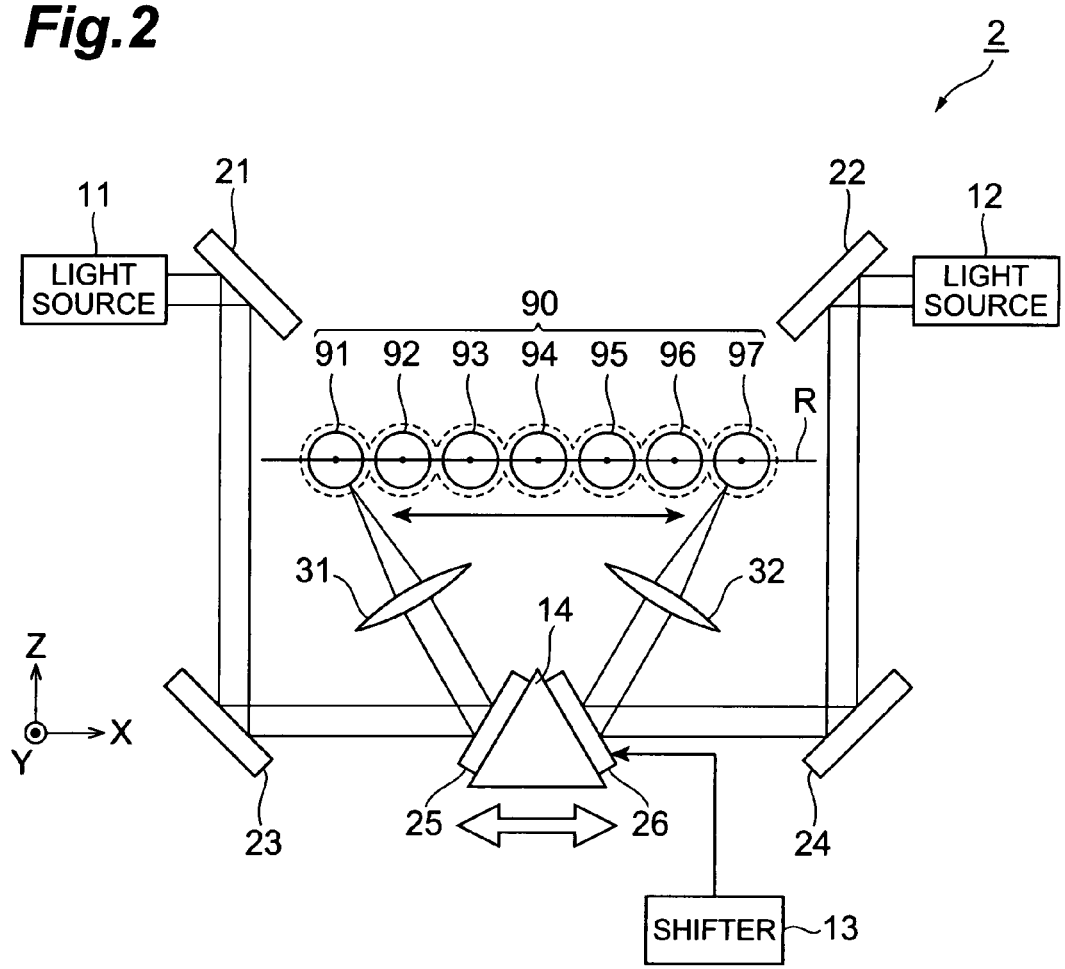
FIG. 2 is a view showing a structure for irradiating the rear face of the object with laser light as a second embodiment of the laser processing apparatus according to the present invention.

FIG. 2 is a view showing a structure for irradiating the rear face of an object with laser light as a second embodiment of the laser processing apparatus according to the present invention. The laser processing apparatus 2 according to the second embodiment comprises a light source system, mirrors 21 to 26, lenses 31, 32, and a shifter 13. The light source system of the laser processing apparatus 2 according to the second embodiment includes a light source 11 (first light source) for outputting a first laser light beam and a light source 12 (second light source) for outputting a second laser light beam. The mirrors 21, 23, and lens 31 constitute a first irradiation optical system for guiding the first laser light beam to an object to be processed 90, while the mirrors 22, 24, 26 and lens 32 constitute a second irradiation optical system for guiding the second laser light beam to the object to be processed 90.

Among the mirrors 21 to 26 constituting the first and second irradiation optical systems, the mirrors 25, 26 are attached to a head part 14 arranged on the rear face side of the object to be processed 90. As the shifter 13 moves the head part 14 along the second direction L2 on the plane R (see FIG. 1B), the position of the object to be processed 90 relatively changes with respect to the first and second laser light beams emitted in directions different from each other.

In the laser processing apparatus 2 and laser processing method according to the second embodiment, as shown in FIG. 2, the first laser light beam outputted from the light source 11 is converged by the lens 31 after being successively reflected by the mirrors 21, 23, 25. Namely, the first irradiation optical system constructed by the mirrors 21, 23, 25 and lens 31 irradiates the rear face side of the object to be processed 90 with the converged first laser light beam. On the other hand, the second laser light beam outputted from the light source 12 is converged by the lens 32 after being successively reflected by the mirrors 22, 24, 26. Namely, the second irradiation optical system constructed by the mirrors 22, 24, 26 and lens 32 irradiates the rear face side of the object to be processed 90 with the converged second laser light beam. During when such first and second laser light beams are emitted, the shifter 13 moves the head part 14 along the second direction L2 on the plane R, whereby each of the first and second laser light beams scans the surface (having irregularities) of the object to be processed 90 along the second direction L2. As a result, the resin layer positioned on the rear face side of the multicore fiber ribbon (including optical fibers as the plurality of objects 91 to 97) acting as the object to be processed 90 is cut by scanning with the first and second laser light beams along the second direction L2 as mentioned above without damaging the optical fibers 91 to 97.

It will be preferred in each of the first embodiment (upper face irradiation) and second embodiment (rear face irradiation) when the direction of laser light irradiation (first irradiation direction) onto the surface of the object to be processed 90 by the first irradiation optical system including the lens 31 is 85° or less in a plane (xz-plane shown in FIG. 1B), orthogonal to the plane R, including the second direction L2, and when the direction of laser light irradiation (second irradiation direction) onto the surface of the object to be processed 90 by the second irradiation optical system including the lens 32 is 95° or more in the same plane. Preferably, the first and second irradiation directions are set such that the angle formed by the first irradiation direction and a normal to the plane R equals the angle formed by the second irradiation direction and the normal to the plane R. The mirrors 25, 26, lenses 31, 32, and head part 14 may be assembled integrally. In this case, the shifter 13 moves an assembly including the first and second irradiation optical systems in a direction parallel to the plane R (arrangement surface) and perpendicular to the axes of the cylindrical objects 91 to 97 (corresponding to the first direction L1). Such a structure enables laser processing such as cutting of a surface coating layer on a surface of the object to be processed 90 even when the surface has irregularities.

Figure 3A:
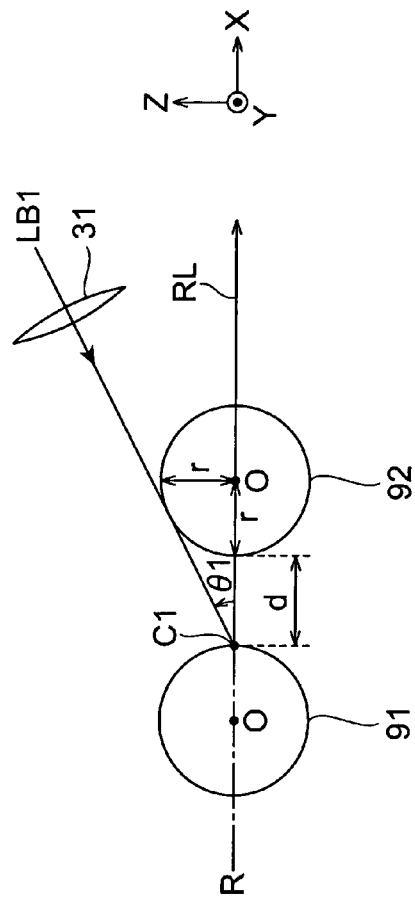
FIGS. 3A and 3B are views for explaining the respective irradiation directions of first and second laser light beams.
Figure 3B:
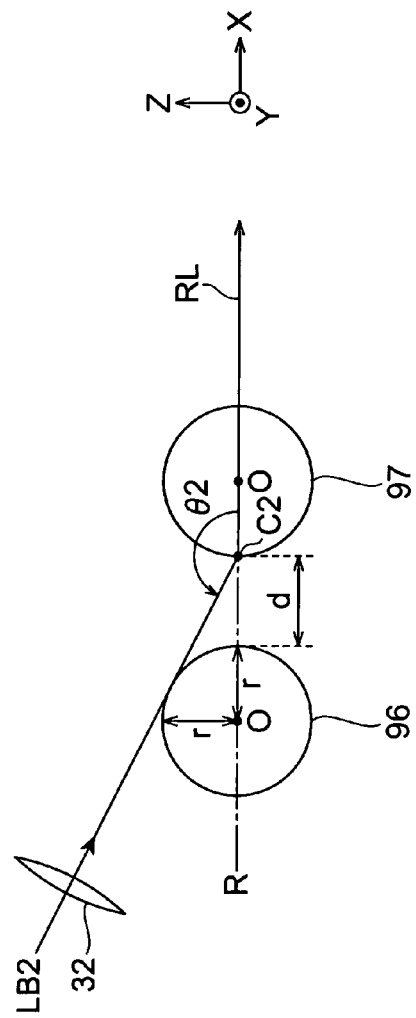

FIGS. 3A and 3B are views for explaining laser light irradiation directions. In particular, FIG. 3A is a view (corresponding to the xz-plane in FIG. 1B) for explaining the irradiation direction of the first laser light beam, while FIG. 3B is a view (corresponding to the xz-plane in FIG. 1B) for explaining the irradiation direction of the second laser light beam. As shown in FIGS. 3A and 3B, let r be the radius of each of the cylindrical objects 91 to 97 arranged such that their centers O are positioned on the plane R (arrangement surface), and d be the minimum space between the cylindrical objects 91 to 97. Here, it will be preferred when the angle $\theta 1$ formed by the reference line RL on the plane R and the first irradiation direction falls within the range from $\sin^{-1}(r/(d+r))$ to 85°. Regarding the irradiation angle $\theta 1$ of the first laser light beam, the reference line RL is, as shown in FIG. 3A, defined as a apart of a line extending along the x-axis (corresponding to the second direction L2) from the intersection point C1 of the plane R and the first irradiation direction. Similarly, it will be preferred when the angle $\theta 2$ formed by the reference line RL on the plane R and the second irradiation direction falls within the range from 95° to $(180-\sin^{-1}(r/(d+r)))$. Regarding the irradiation angle $\theta 2$ of the second laser light beam, the reference line RL is, as shown in FIG. 3B, defined as a apart of a line extending along the x-axis (corresponding to the second direction L2) from the intersection point C2 of the plane R and the second irradiation direction. When the angles $\theta 1$ and $\theta 2$ are set within the range mentioned above, the object to be processed 90 can be laser-processed as intended.

The above-mentioned laser processing method and laser processing apparatus may laser-process objects having irregularities on their surfaces or a plurality of cylindrical objects arranged flatly.

An experiment was conducted for a case where 10 copper tubes each having a radius of 50 μm were arranged in contact with each other as objects to be processed, for example. Namely, thus arranged objects to be processed were irradiated with YAG laser light (having a wavelength of 1064 nm) from both the upper and rear face sides thereof while each of the angles $\theta 1$ and $\theta 2$ was set to 60°. As a result, grooves were continuously formed about the individual copper tubes.

Further, an experiment was conducted for a case where a plurality of coaxial cables were arranged in parallel as objects to be processed. In this case, both the upper and rear face sides of the objects to be processed were irradiated with YAG laser light while each of the angles $\theta 1$ and $\theta 2$ was set to 60°. As a result, coatings about the individual coaxial cables were continuously cut.

As described above, even under circumstances where surfaces of objects to be processed have irregularities, e.g., when the objects are arranged regularly, the present invention can laser-process the surfaces of the objects.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A laser processing method of irradiating respective surfaces of a plurality of objects each having a cylindrical form extending in a first direction with laser light, so as to process the plurality of objects, said laser processing method comprising steps of:

arranging the plurality of objects on a first plane and on a reference line orthogonal to the first direction as viewing on one surface side of a second plane which is orthogonal to the first plane at the reference line;

as viewing on the one surface side of the second plane, irradiating the plurality of objects with a first laser light beam at a first irradiation angle of 85° or less with respect to the reference line and from one surface side of the first plane, and irradiating the plurality of objects with a second laser light beam at a second irradiation angle of 95° or more with respect to the reference line and from the one surface side of the first plane; and during the first and second laser light beams are emitted, relatively reciprocating respective irradiation points of the first and second laser beams with respect to the first plane along the reference line.

2. The laser processing method according to claim 1, wherein, letting r be the radius of each of the plurality of objects, d be the minimum space between the plurality of objects, θ1 be the first irradiation angle, and θ2 be the second irradiation angle, the first irradiation angle θ1 falls within the range from $\sin^{-1}(r/(d+r))$ to 85°, and the second irradiation angle θ2 falls within the range from 95° to $(180° - \sin^{-1}(r/(d+r)))$.

3. A laser processing apparatus of irradiating a surface of a plurality of objects each having a cylindrical form extending in a first direction with laser light, so as to process the plurality of objects, said laser processing apparatus comprising:

a light source system for outputting the laser light;

a shifter for relatively moving respective irradiation points of the laser light with respect to the laser light in a state where the plurality of objects are arranged on a first plane and on a reference line orthogonal to the first direction;

a first irradiation optical system for irradiating the plurality of objects with a first laser light beam as a part of the laser light outputted from said light source system at a first irradiation angle of 85° or less with respect to the reference line and from one surface side of the first plane, as viewing on one surface side of a second plane which is orthogonal to the first plane at the reference line; and a second irradiation optical system for irradiating the plurality of objects with a second laser light beam as a part of the laser light outputted from said light source system at a second irradiation angle of 95° or more with respect to the reference line and from the one surface side of the first plane, as viewing on the one surface side of the second plane.

4. The laser processing apparatus according to claim 3, wherein said light source system includes a single light source, and wherein laser light components obtained by dividing the laser light outputted from said single light source into two are outputted as the first and second laser light beams.

5. The laser processing apparatus according to claim 3, wherein said light source system includes a first light source for outputting the first laser light beam, and a second light source for outputting the second laser light beam.

6. The laser processing apparatus according to claim 3, wherein the first laser light beam has the same wavelength as that of the second laser light beam.

7. The laser processing apparatus according to claim 3, wherein the shifter respectively moves at least a part of the first and second irradiation optical systems such that respective irradiation points of the first and second laser light beams reciprocate along the reference line.

* * * * *